UNITED STATES PATENT OFFICE.

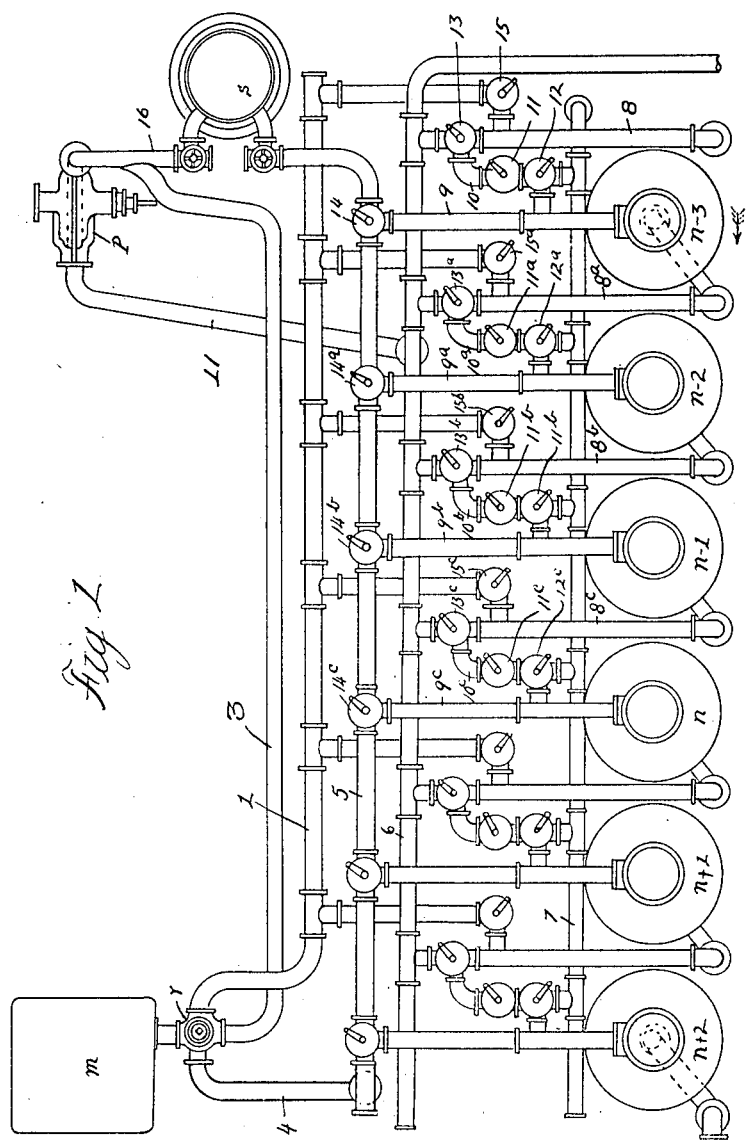

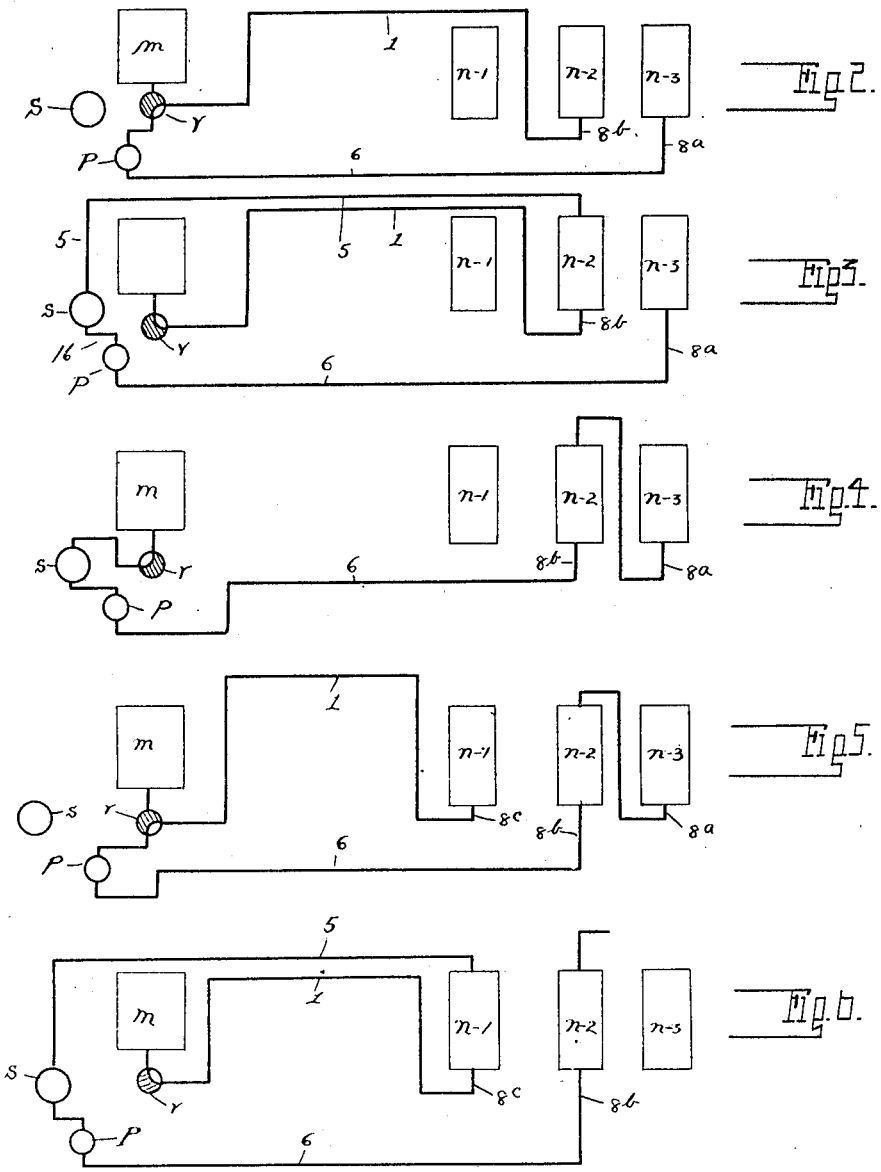

LEON NAUDET, OF CHELLES, FRANCE.

SUGAR MANUFACTURE.

1,286,066.  Specification of Letters Patent.  Patented Nov. 26, 1918.

Application filed March 5, 1914. Serial No. 822,666.

*To all whom it may concern:*

Be it known that I, LEON NAUDET, a citizen of the French Republic, and a resident of 30 Avenue Chilpéric, Chelles, Seine-et-Marne, France, have invented certain new and useful Improvements in and Relating to Sugar Manufacture, of which the following is a complete specification.

The invention relates to sugar extraction apparatus, and it is the primary object of the invention to obtain a construction adapted for the carrying out of an improved process. This improved process consists essentially in the treatment of the sugar-producing material in each newly-charged cell with successive displacements of equal-weight volumes of juice at high temperature, preferably 100° C. or over. The number of such passes is sufficient to raise the charge to the same temperature, so that the juice of succeeding passes will not be lowered in temperature other than through losses by radiation. Consequently the entire extraction process may be carried out at a higher temperature than heretofore practicable, and an exact volume of liquid is passed through each cell, rendering the density of the final juice uniform.

To raise the temperature of the sugar-producing material to any desired point, it is necessary to pass at least three equal-weight volumes of juice at the desired temperature through the cell containing said material. This I accomplish by my improved apparatus, in which in addition to the usual measuring tank and pump there is a heater of sufficient capacity to raise the temperature of the juice passing therethrough to the desired point. Provision is also made for progressively advancing the connections to the heater in relation to the series of cells, so that the same relative position is maintained in relation to each newly-charged cell. Furthermore, connections are provided for shunting out the heater for certain passes of the juice, as will be hereinafter explained. One characteristic feature of the apparatus is that under normal operation the greater part of the heat which is imparted to the sugar-producing material in raising it to its maximum temperature is supplied by this single heater, while at the same time the heat throughout the entire series of cells is maintained relatively high.

In the drawings:

Figure 1 is a diagrammatic plan view of a portion of my improved apparatus;

Figs. 2, 3, 4, 5 and 6 are diagrams, showing successive steps in the operation.

$n-3$, $n-2$, $n-1$, $n$, $n+1$ and $n+2$ are a series of cells, constituting a sugar-extraction battery. $p$ is the pump, $m$ the measuring tank and $s$ the heater. Interconnection between these various parts is provided by a series of conduits, which may be alternatively connected with each cell by the manipulation of valves in the connections. The arrangement of the conduits and the valves in the connections enables the progressive advance of the connections to the heater relative to the series of cells. Specifically, 1, 5, 6 and 7 are conduits extending the length of the series; 8, $8^a$, $8^b$, etc., are conduits connected to the bottom of each cell; and 9, $9^a$, $9^b$, etc., are conduits connected to the top of each cell. 10, $10^a$, $10^b$, etc., are coupling connections between the conduits 8 and 9, etc. 11, $11^a$, $11^b$, etc., are valves in the coupling conduits; 12, $12^a$, $12^b$, etc., are valves controlling connection between the conduit 7 and the conduits 9, $9^a$, etc.; 13, $13^a$, $13^b$, etc., are valves controlling connection between the conduit 6 and the conduits 8, $8^a$, etc.; 14, $14^a$, $14^b$, etc., are valves controlling connection between the conduit 5 and the conduits 9, $9^a$, etc.; and 15, $15^a$, $15^b$, etc., are valves connecting the conduits 8, $8^a$, etc., with the conduit 1. The conduit 1 is connected to the measuring tank $m$, and the conduit 5 is connected to the heater $s$. A conduit 16 connects the heater $s$ in series with the pump $p$, a conduit 17 connects the pump with the conduit 6, a conduit 3 forms a by-pass from the pump to the measuring tank $m$, and a conduit 4 a by-pass between the measuring tank and the conduit 5. There is also a four-way valve $r$ controlling connection between the conduits 1, 3 and 4 and the conduit 2, which directly connects with the measuring tank $m$.

With the specific construction as just described in operation, the conduit 7 is connected with the source of water supply, and by opening any one of the valves 12, $12^a$, $12^b$, etc., water is admitted from said conduit into the top of the corresponding cell. By opening any one of the valves 11, $11^a$, etc., connection is established between the bottom of one cell and the top of the adjacent cell.

By opening any one of the valves 13, 13ª, etc., connection is established between the bottom of the corresponding cell and the conduit 6, and by opening any one of the valves 14, 14ª, etc., connection is established between the top of the corresponding cell and the conduit 5. The direction of progression, as shown in Fig. 1, is from right to left, as indicated by the arrow. Assuming, and as shown in Fig. 2, that cell $n$—3 is the last of the series of operating cells and that cell $n$—2 is the mashed cell and $n$—1 the cell from which the exhausted charge is to be removed and a new charge to be introduced, the operation will be as follows:

The opened valves are 11, 13ª, 14ª and 15ᵇ, and the four-way valve $r$ is adjusted to connect the conduit 1 with the measuring tank $m$. Thus the juice will pass from the conduit 8, through valve 11, into conduit 9, into the top of cell $n$—3, and then, as shown in Fig. 3, out through conduit 8ª, valve 13ª, conduits 6 and 17 to pump $p$; thence through conduit 16, heater $s$ and conduit 5, valve 14ª, conduit 9ª, into the top of cell $n$—2. The juice thus entering this cell will displace the mashing juice therefrom, out through conduit 8ᵇ, valve 15ᵇ, into conduit 1, and through the four-way valve $r$ into the measuring tank $m$, from which the juice may be transferred to a suitable container (not shown). The parts remain in this adjustment until a volume of juice is drawn into the measuring tank which is equal in weight to the sugar-producing material in the cell, and inasmuch as the juice from cell $n$—3 passes through the heater $s$, it will be delivered into cell $n$—2 at maximum temperature (100° C. or over).

After this equal-weight volume of juice has been drawn, the valves 13ª and 15ᵇ are closed, and valves 11ª and 13ᵇ are opened. The valve $r$ is also adjusted to disconnect the conduit 1 from the tank $m$ and connect the conduit 4 to said tank. As shown in Fig. 4, this will permit the juice to flow out from the cell $n$—3, through conduit 8ª, valve 11ª, conduit 9ª, directly into the top of cell $n$—2, out through conduit 8ᵇ, valve 13ᵇ, conduits 6 and 17, pump $p$, heater $s$, conduits 5 and 4, and valve $r$ into the tank $m$. While in this position of adjustment a volume of juice is passed into the measuring tank, which volume is substantially equal in weight to the excess over the weight of the sugar-producing material of three average passes of juice.

The valve 15ᶜ is then opened and the valve $r$ adjusted to connect the conduit 3 to the conduit 1. As shown in Fig. 5, the juice will then pass from the cell $n$—3 to the cell $n$—2, from the latter to the pump, and through the conduit 3, valve $r$, conduit 1, valve 15ᶜ into conduit 8ᶜ, and into the bottom of cell $n$—1, which cell has just been filled with a charge of the sugar-producing material. The juice thus admitted will drive out the air from the interstices of the sugar-producing material, thereby effecting the mashing and filling the cell $n$—1. In the next operation, as shown in Fig. 6, the valve 14ᵇ is opened, and the valve $r$ adjusted to connect the conduit 1 to the measuring tank $m$, which permits juice to pass from the bottom of cell $n$—2, through pump $p$, heater $s$, valve 14ᵇ, conduit 9ᵇ, into top of tank $n$—1, displacing the mashing juice therefrom through conduit 8ᶜ, valve 15ᶜ, conduit 1, valve $r$ and into the measuring tank, from which the juice is transferred to a suitable container (not shown). This latter step bears the same relation to the cell $n$—2 that the first described step shown in Fig. 3 bore to the cell $n$—3, and therefore is the first step of a new cycle.

The diagrams, Figs. 2 to 6, which omit all of the unused conduits and valves, show more clearly the succession of steps than Fig. 1, but are intended to represent the same apparatus. It is obvious that the exact construction and relation of the various conduits and valves is not essential so long as the sequence of operations above described may be carried out. It is, however, essential to provide means for progressively advancing the connections to the heater $s$ and for coupling the measuring tank with the various intermediate conduits, as has been described,—so that in every stage of the operation the measured volume of juice is passed through a single series, including all of the operating cells.

What I claim as my invention is:

In a sugar extracting apparatus, the combination with a series of cells and means for passing the juices through said cells by successive displacements, of a heater for raising the temperature of the juice to the maximum point having connections to said cells, a pump in the connections from the cells to the heater, means for progressively advancing the connections of said heater corresponding to the advance in the charging of the cells to maintain a constant relation to the active cells of the series, and means for by-passing the juice from said pump directly to the bottom of any cell.

In testimony whereof I have hereunto placed by hand at Paris (France), this 17th day of February, 1914.

LEON NAUDET.

In the presence of two witnesses:
HANSON C. COXE,
HENRY SOHTRAB.